United States Patent [19]

Hayashi et al.

[11] Patent Number: 4,845,986
[45] Date of Patent: Jul. 11, 1989

[54] LIQUID LEVEL INDICATION DEVICE

[75] Inventors: Chikahisa Hayashi; Makoto Kawai; Yoshikazu Hirose, all of Aichi, Japan

[73] Assignee: Toyoda Gosei Co., Ltd., Nishikasugai, Japan

[21] Appl. No.: 894,919

[22] Filed: Aug. 8, 1986

[30] Foreign Application Priority Data

Aug. 14, 1985 [JP] Japan ............................ 60-124758[U]
Aug. 14, 1985 [JP] Japan ............................ 60-124759[U]

[51] Int. Cl.⁴ ...................... G01F 23/72; H01F 21/04
[52] U.S. Cl. .................................. 73/290 R; 336/30; 336/75
[58] Field of Search .................. 73/290 R, 308, 313; 336/213, 136, 234, 30, 73, 75

[56] References Cited

U.S. PATENT DOCUMENTS

| | | | |
|---|---|---|---|
| 721,289 | 6/1902 | Depp et al. | 336/213 |
| 1,474,597 | 11/1923 | Kent | 336/234 X |
| 2,280,981 | 4/1942 | Schuh | 336/234 X |
| 2,542,048 | 2/1951 | Nagel | 336/234 X |
| 2,547,793 | 4/1951 | Spoor | 336/73 |
| 2,972,724 | 2/1961 | Flumerfelt | 336/213 |
| 3,074,039 | 1/1963 | Ford | 336/213 |
| 3,303,449 | 2/1967 | Stimler | 336/234 X |
| 3,678,748 | 7/1972 | Dziedzic | 73/290 R |
| 3,719,902 | 3/1973 | Esterly | 336/130 X |
| 3,834,234 | 9/1974 | Kobayashi et al. | 73/290 R |
| 3,942,105 | 3/1976 | Bonderenko et al. | 73/290 R |
| 3,948,100 | 4/1976 | Paris et al. | 73/290 R |
| 4,368,447 | 1/1983 | Inomata et al. | 336/213 X |
| 4,480,469 | 11/1984 | Tice | 73/313 X |
| 4,621,248 | 11/1986 | Shigeta et al. | 336/234 |
| 4,638,250 | 1/1987 | Shen-Orr et al. | 324/207 X |

FOREIGN PATENT DOCUMENTS

| | | |
|---|---|---|
| 2210298 | 9/1973 | Fed. Rep. of Germany . |
| 3309089 | 9/1983 | Fed. Rep. of Germany . |
| 3235033 | 3/1984 | Fed. Rep. of Germany . |
| 0040708 | 4/1981 | Japan .................. 324/208 |

Primary Examiner—Daniel M. Yasich
Attorney, Agent, or Firm—Cushman, Darby & Cushman

[57] ABSTRACT

A liquid level indicator for detecting a liquid level by utilizing the variation inductance of a coil having a core made of an electrical insulating magnetic material and provided inside a winding of the coil. The core may be made by piling a plurality of thin, plate-shaped conductive materials one on another in the cross-sectional direction of the coil so that they are insulated from each other or by winding a conductive magnetic material at least one turn in the form of a roll so that a closed loop current is not formed in the cross-sectional direction of the coil. An eddy current loss of the core so arranged is so small that it can be disregarded. Furthermore, the winding component of the core itself is substantially released in the equivalent circuit of the coil.

16 Claims, 7 Drawing Sheets

LIQUID LEVEL INDICATION DEVICE

BACKGROUND OF THE INVENTION

This invention relates to a liquid level indicator for detecting and indicating the levels of a variety of liquids such as gasoline, oil, petroleum and water in various containers such as tanks provided for automobiles, industrial machines, etc., and more particularly, to the core of a coil which is provided in the liquid level detecting section of the liquid level indicator.

A float arm type or linear potentiometer type liquid level indicator in which a potentiometer is operated by a float arm, an induction type liquid level indicator in which the variation in inductance of a coil is utilized, and many other types of liquid level indicators are available in the art. Of these conventional liquid level indicators, the induction type liquid level indicator is the most excellent in measurement accuracy.

Some of the present inventors have proposed an induction type liquid level indicator in which a conductive ring with a float is put on a coil in such a manner that it is movable on the outer circumferential wall of the coil, and the variation in inductance of the coil with the movement of the conductive ring is converted into a variation of voltage so that the level meter is operated. In the case of this liquid level indicator, in order to increase the variation in inductance of the coil thereby to increase the liquid level detecting sensitivity, it is desirable to provide a core inside the coil.

In order that the variation in inductance of the coil is caused only by the movement of the conductive ring with the winding component of the core itself released, it is preferable that the core is made of a magnetic material electrically insulated. A typical example of the core thus made is a ferrite core. However, if the core is made of such an electrically insulated magnetic material, (1) because of the electrical insulation the coil has a stray capacitance which distorts the coil voltage. (2) In order to cancel the stray capacitance, it is necessary to provide a suitable means. (3) Since the core is formed by pressing as in the case of forming a ferrite core, it is necessary to provide different metal molds respectively for cores different in length. (4) Long cores are liable to be curved or broken because they are low both in moldability and in mechanical strength.

SUMMARY OF THE INVENTION

In order to eliminate the above-described difficulties, in a liquid level indicator according to this invention, a plurality of thin, plate-shaped conductive magnetic materials are piled one on another in the cross-sectional direction of a coil while being electrically insulated from one another, to form a core, and the core thus formed is provided inside the coil.

The magnetic materials laminated in the cross-sectional direction of the coil are electrically insulated from one another as was described above, and therefore, an extremely small eddy current flows in each of the magnetic materials in the cross-sectional direction of the core (lamination direction). Accordingly, the eddy current loss of the core is so small that it can be disregarded. Furthermore, in the equivalent circuit of the coil, the winding component of the core itself is substantially released, and therefore, the variation in inductance of the coil is scarcely affected by the winding component.

Also, since the magnetic materials are conductive, the stray capacitance induced in the winding of the coil is extremely small. Therefore, the coil voltage is scarcely distorted by the stray capacitance, and accordingly it is unnecessary to additionally provide a stray capacitance cancelling means.

The core can be readily formed merely by laminating the thin, plate-shaped magnetic materials without using a mold. In the case where it is required to form a variety of cores different in length, it is unnecessary to provide various molds corresponding to the different lengths; that is, the cores different in length can be obtained by cutting a core into pieces having the required lengths. Furthermore, a long core can be readily formed, and the long core thus formed is high in mechanical strength.

BRIEF DESCRIPTION OF THE DRAWINGS

FIGS. 1 through 6 show a first example of a liquid level indicator for the fuel tank of an automobile, to which the technical concept of this invention is applied by way of example.

FIGS. 8 through 10 show a second example of the liquid level indicator according to the invention.

DETAILED DESCRIPTION OF THE INVENTION

A first example of a liquid level indicator mounted on the fuel tank of an automobile for indicating the quantity of fuel such as gasoline remaining in the fuel tank to which the technical concept of the invention is applied will be described with reference to FIGS. 1 through 6.

Figure 4:
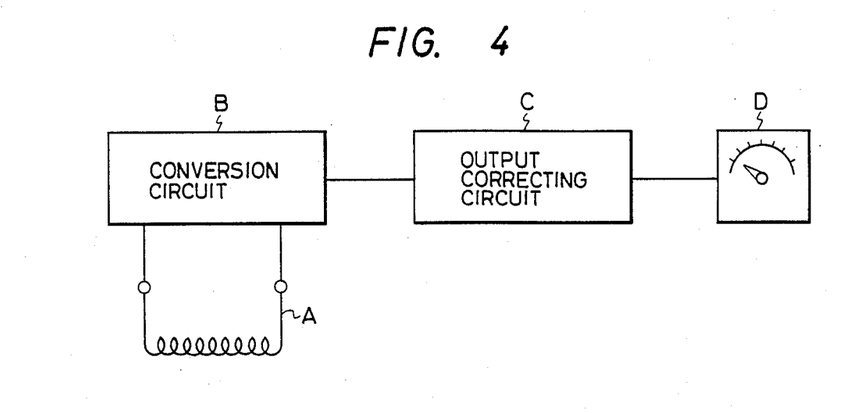
FIG. 4 is a block diagram showing the entire arrangement of the liquid level indicator according to the invention.

First, the entire arrangement of the liquid level indicator will be described with reference to FIG. 4. The liquid level indicator of the present invention, as shown in FIG. 4, comprises: a detecting section A in which a float incorporating a conductive ring is movably mounted on a coil with a bar-shaped core, a conversion circuit B connected to the coil to convert the inductance variation into a voltage or current variation, an output correcting circuit C for matching the output voltage of the conversion circuit B to the characteristic of a level meter, and the level meter D. These sections A through D will be described in more detail, in the stated order.

DETECTING SECTION A

The detecting section A will be described with reference to FIGS. 1 through 6. In these figures, reference numeral 1 designates the fuel tank of an automobile for storing fuel 2 such as gasoline, the fuel tank being represented by the upper plate 3 and the bottom plate 4, whereas numeral 5 designates a hole into which the detecting section A is inserted.

Figure 2:
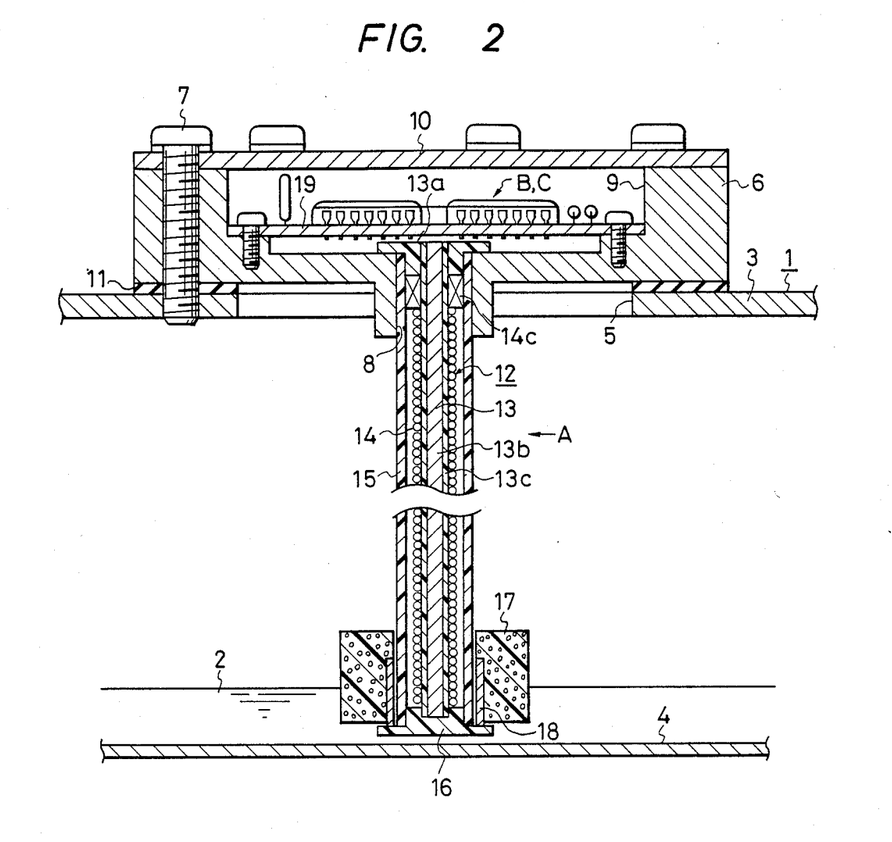
FIG. 2 is a sectional view of the entire detecting section of the liquid level indicator according to the invention.

Reference numeral 6 designates the housing of the detecting section A which is mounted on the upper plate 3 with screws 7. The housing 6 has a through-hole 8 at the center. Reference numeral 9 designates an accommodating recess formed in the upper portion of the housing 6. The recess 9 is closed with a cover 10. Reference numeral 11 designates a packing interposed between the housing 6 and the tank 1.

Reference numeral 12 designates a bar-shaped coil which is provided in the through-hole 8 and extended downwardly near to the bottom plate 4. The coil 12 comprises a core, a winding and a sleeve as will be described later.

Figure 1:
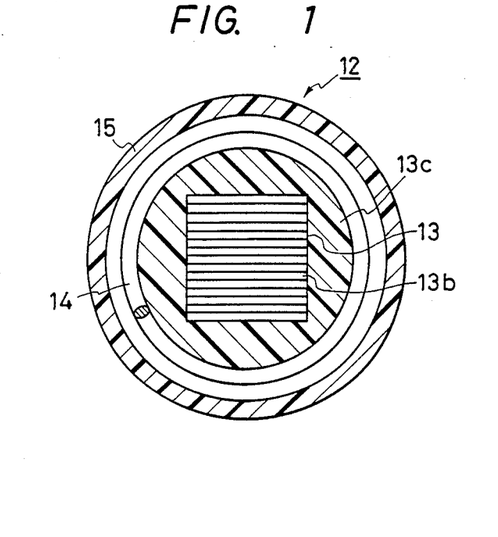
FIG. 1 is a sectional view of a coil assembly in the liquid level indicator according to the invention.
Figure 3:
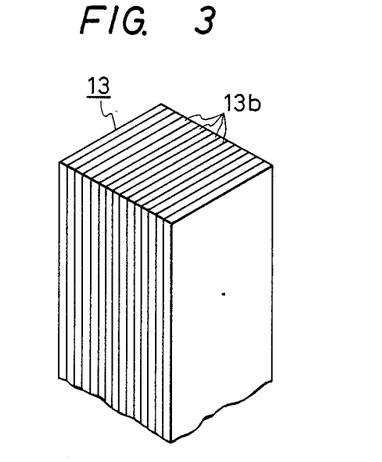
FIG. 3 is a perspective view showing a part of a core in the coil assembly.

Reference numeral 13 designates a bar-shaped core rectangular in section which is fixed in the through-hole 8 through a core holder 13a and extended near to the bottom plate 4. As shown in FIGS. 1 and 3, a plurality of thin, plate-shaped conductive magnetic materials 13b are piled one on another while being electrically insulated from one another to thereby form the bar-shaped core 13. The bar-shaped core 13 is approximately $7 \times 7$ mm$^2$ in cross-sectional area (substantially square) and 160 mm in length.

In the first example of the liquid level indicator of the present invention, each of the magnetic materials 13b is a silicon steel plate about 0.3 mm on a side in thickness, 7 mm in width and 160 mm in length, and the surfaces are covered with electrically insulating glass (carlite). Therefore, when the silicon steel plates are piled one on another, they are electrically insulated from one another. The magnetic materials 13b are bonded to one another with adhesive such as varnish.

Reference character 13c designates a polyester resin cover part formed in the form of a cylinder around the bar-shaped core 13 is rectangular in cross-section as shown in FIG. 1.

Figure 5:
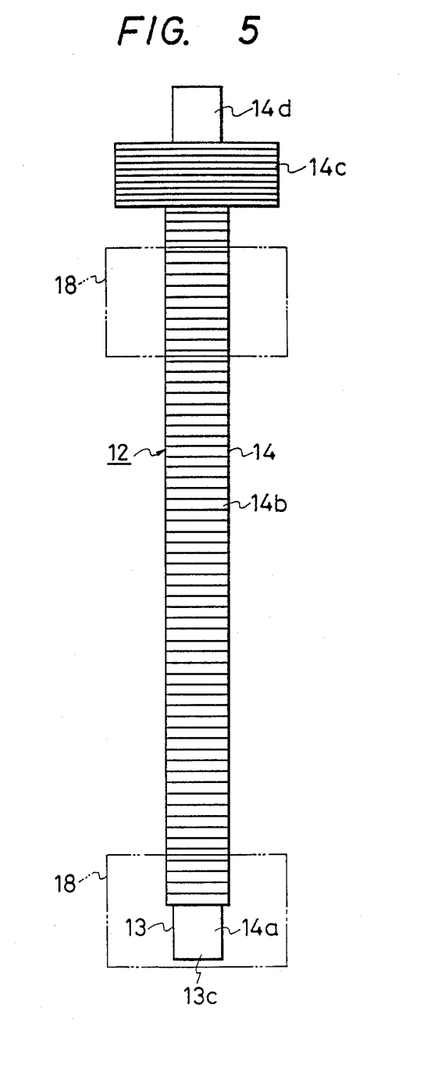
FIG. 5 is a front view of the coil assembly.

Reference numeral 14 designates the winding of the coil 12 which is wound around the cover part 13c according to the following winding method. As shown in FIG. 5, the lowermost end portion, about 10 mm in length, of the core 13 is a non-winding portion 14a where no winding is formed, and the non-winding portion 14a is followed by a flatwise winding portion 14b formed on the portion of the core 13 which is from 10 mm to 140 mm from the lower end of the core 13. In the flatwise winding portion 14b, the wire is wound uniformly in one direction. The flatwise winding portion 14b is followed by a close winding portion 14c formed on the portion of the core 13 which is from 10 mm to 20 mm from the upper end of the core 13. In the close winding portion 14c, a number of turns are formed. The uppermost end portion, about 10 mm in length, of the core 13 is a non-winding portion 14d.

As was described above, the winding 14 is wound on the cylindrical cover part 13c instead of the bar-shaped core 13 rectangular in section. Therefore, the wire winding operation can be achieved smoothly. That is, in the wire winding operation, the wire is bent gently, and no excessively large stress is applied to the wire.

Reference numeral 15 designates a sleeve of synthetic resin (non-magnetic material) which is loosely fitted on the winding 14 and is fitted in the throughhole 8. The sleeve is adapted to protect the winding 14 and to guide the vertical movement of a float (described later). Reference numeral 16 designates a cap connected to the lower end of the sleeve 15. The cap is made of synthetic resin (non-magnetic material) and is adapted to prevent the entrance of fuel 2 into the sleeve 15.

Reference numeral 17 designates a float loosely fitted on the coil 12 in such a manner that it is movable vertically. The float 17 is annular and is made of foamed rubber or synthetic resin. The specific gravity of the float 17 is smaller than that of the fuel 2. Therefore, the float floats on the fuel 2, and is moved vertically as the liquid level changes. Reference numeral 18 designates a conductive ring attached to the inner circumferential wall of the float 17. The conductive ring 18 is made of synthetic resin in which a conductive macromolecular material such as carbon is impregnated. The conductive ring 18 is held by the aforementioned cap 16 so that it may not come off.

Reference numeral 19 designates a circuit board on which the conversion circuit B and the output correcting circuit C (described later in detail) are provided.

Figure 6:
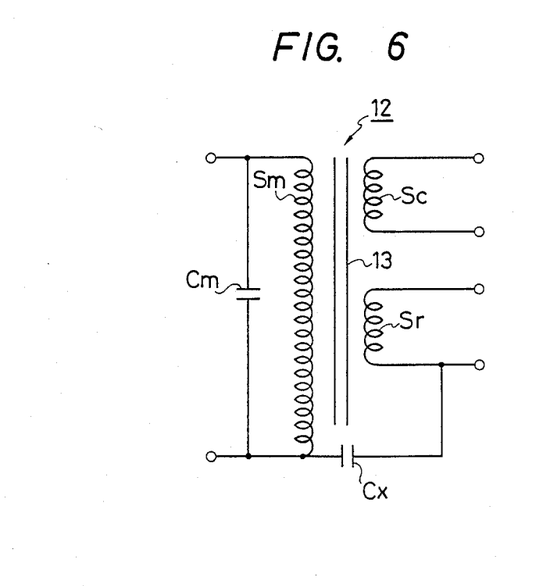
FIG. 6 is an equivalent circuit diagram of the coil assembly.

The equivalent circuit of the coil 12 is as shown in FIG. 6. The magnetic materials 13b piled one on another in such a manner that their planes cross the coil 12 are electrically insulated from one another as was described before. Therefore, the winding component Sc of the core 13 is substantially released.

Since the conductive ring 18 is conductive, its winding component Sr is shorted. In FIG. 6, reference character Sm designates the winding component of the winding 14, and reference character Cm is the stray capacitance of the winding 14. Since the magnetic materials 13b are conductive, the stray capacitance Cm is extremely small. Further in FIG. 6, reference character Cx designates the electrostatic capacitance between the conductive ring 18 and the coil 12. The capacitance Cx is constant irrespective of the movement of the conductive ring 18.

Now, a method of manufacturing the core 13 and its effects will be described.

Commercially available silicon steel plates about 0.3 mm in thickness and 7 mm in width are employed as the magnetic materials 13b (hereinafter referred to "magnetic plates 13b", when applicable) of the core 13. These silicon steel plates are wound on a bobbin or the like. A plurality of silicon steel plates are set on a rewinder.

The silicon steel plates are rewound simultaneously, and after adhesive such as varnish is applied between the silicon steel plates, the silicon steel plates are successively piled one on another under pressure, to form a long core 13. Then, polyester resin is extruded in the form of a cylinder around the core 13 thus formed, to form the cover part 13c. Thereafter, the long core 13 covered by the cover part 13c is cut into pieces 160 mm long.

As is apparent from the above description, in the embodiment of the invention, the core 13 can be formed readily without using the mold which should be used for manufacturing ferrite cores or the like. Furthermore, in the case where it is required to provide cores 13 which are different in length, according to the invention it is unnecessary to provide different molds to form the cores, that is, the cores can be obtained merely by cutting the core formed as described above into pieces different in length. Thus, the manufacturing cost can be greatly reduced. A relatively long core 13 can be formed according to the above-described method, and its mechanical strength is sufficiently high.

The winding 14 is not directly wound on the bar-shaped core 13 rectangular in section, and instead it is wound on the cylindrical cover part 13c. Therefore, the wire can be smoothly wound on it without being greatly bent. In other words, no large stress is applied to the wire in the winding operation. Furthermore, the cover part 13c is formed in succession with the formation of the core 13. Therefore, the method is more advantageous both in manufacture and in cost than a method in which a bobbin is put on the core.

The function of the detecting section A thus formed will be described.

When, in the case where the magnetic circuit of the coil 12 is in an open state and a voltage is applied thereto, a magnetic flux distribution is formed. In this case, an electromagnetic induction occurs with the conductive ring 18, and since the ring 18 is conductive, an eddy current loss is caused. Therefore, the inductance as viewed from the winding 14 is decreased. That is, the decrease of the inductance changes with the magnetic flux distribution of the coil 12. On the other hand, as the fluid level changes, the float 17 is moved vertically, and accordingly the ring 18 is also moved along the coil 12. The density of the magnetic flux perpendicular to the conductive ring 18 depends on the position of the coil 12, and so does the eddy current loss. Accordingly, the inductance changes with the movement of the conductive ring 18.

It is assumed that when the fuel tank is empty and the float 17 is at the lowermost position, X=0 (where X is the displacement of the float 17 from the lower end of the coil 12), and when the fuel tank is filled with fuel 2, the float is at the uppermost position, X=F.

If the winding 14 is a uniform flatwise winding in its entirely, then the coil is vertically symmetrical, and the density of the magnetic flux perpendicular to the conductive ring 18 is maximum at the middle of the coil 12. Therefore, the inductance is minimum when X is close to F/2. Accordingly, the linearity of the inductance for all of the displacements cannot be obtained.

In the embodiment, however, the flatwise winding portion 14b is followed by the close winding portion 14c so that the magnetic flux distribution is made asymmetric. Therefore, the density of the magnetic flux crossing the conductive ring 18 is maximum near the upper end of the coil 12. Therefore, the position of the conductive ring 18 where the inductance is minimum is near the upper end of the coil 12, and the inductance is decreased with the upward movement of the float 17. The coil further includes the non-winding portions 14a and 14d as was described before, and therefore, the magnetic flux distribution is not uniform so that when X=F the increase of the inductance is suppressed.

As is apparent from the above description, the inductance of the coil 12 thus changes linearly with the displacement (X) of the float 17.

The magnetic plates 13b are laminated in such a manner that their planes cross the coil 12 and are electrically insulated from one another, as was described before. Therefore, in the cross-sectional direction (or the lamination direction) of the core 13, an extremely small eddy current flows in each of the magnetic plates 13b. Accordingly, in the core 13, the eddy current loss is so small that it can be disregarded.

In the equivalent circuit of the coil 12, the winding component Sc of the core itself is substantially released, and therefore, the inductance variation of the coil 12 is scarcely affected by the winding component Sc. Accordingly, the inductance is changed by the conductive ring only, with the result that the detection sensitivity is improved.

Moreover since the magnetic plates 13b are conductive, the stray capacitance Cm of the winding 14 of the coil 12 is extremely small. Accordingly, the coil voltage is scarcely distorted by the stray capacitance Cm, and therefore, it is unnecessary to provide a stray capacitance (Cm) cancelling means.

The conductive ring 18 is made of a material which is small in specific gravity, i.e., it is light and floats on the fuel with a small buoyancy. Accordingly, the float 17 can be made small in size.

Thus, the detecting section A can be readily mounted on the fuel tank 1, and the range of movement thereof in the tank is small. The detecting section A is electrically contactless, and therefore, it is not affected by friction, i.e., the float 17 is smoothly moved up and down. Accordingly, the detection section A operates accurately for a long period. Furthermore, the detection section A never becomes out of order even if the float 17 swings. Moreover, since the surface of the coil 12 is smooth, the particles such as dust and foreign matters in the fuel scarcely stick to the coil 12, and the float 17 can move smoothly at all times. Also, since the float moves linearly along the coil 12, the accuracy is scarcely decreased even when the liquid surface swings horizontally.

CONVERSION CIRCUIT B

The conversion circuit B connected to the detecting section A for converting the variation of inductance of the coil 12 into a voltage or current variation will be described. The circuit B is not limited to a special one. For instance, the following circuit may be employed:

(1) A rectangular pulse signal having a frequency of several kilo-hertz (KHz) to several tens of kilo-hertz (KHz) is applied to an LR series circuit consisting of the above-described coil 12 and a resistor, and the resultant transient response is utilized to perform the L-V (inductance-to-voltage) conversion.

If, in this case, the stray capacitance Cm of the winding 14 of the coil 12 is large, then a resonance circuit is formed to distort the coil voltage waveform of the LR series circuit. However, in the detecting section A of the first example of the liquid level indicator according to the invention, as was described above, the magnetic materials 13b are conductive and therefore the stray capacitance Cm of the winding 14 is extremely small, with the result that the above-described distortion is scarcely caused.

(2) The coil 12 may be combined with an oscillating circuit, so that the variation of the oscillating frequency due to the inductance is detected.

(3) Detection may be carried out by utilizing the phase difference in the above-described LR series circuit consisting of the coil 12 and the resistor. In this case, the oscillation waveform is sinusoidal, and the phase lag of the current in the LR series circuit is detected.

OUTPUT CORRECTING CIRCUIT C AND LEVEL METER D

Any level meter, an analog type level meter or a digital type level meter, can be used as the level meter D of the liquid level indicator if it can indicate a liquid level. However, it is preferable to use a level meter which, even when the power switch of the automobile is turned off, keeps indicating the liquid level at that time, because such a level meter lets the operator to quickly detect the quantity of fuel remaining in the fuel tank, thereby to eliminating the difficulty that all of the fuel is consumed during driving. One example of such a level meter is a hold type level meter in which the pointer is swung to the position where the electromagnetic force induced in the driving electromagnetic coil balances that induced in the braking electromagnetic coil.

The output correcting circuit C is provided to match the output voltage or current of the conversion circuit B with the characteristic of the level meter D, and it is suitably designed according to the kinds of the conversion circuit B and the level meter D. Therefore, depending on the conversion circuit B and the level meter D, the output correcting circuit C may be omitted.

A second example of the liquid level indicator according to the invention will be described with reference to FIGS. 8 and 9 in which those components which have been previously described with reference to FIGS. 1 through 6 are therefore designated by the same reference numerals or characters.

In the second example of the liquid level indicator according to the invention, a thin, plate-shaped conductive magnetic material is wound one turn or more, and the magnetic material layers are electrically insulated from one another so that no current closed loop is formed in the cross-sectional direction of a core assembly. The core assembly thus formed is provided inside the winding of the coil.

Figure 8:
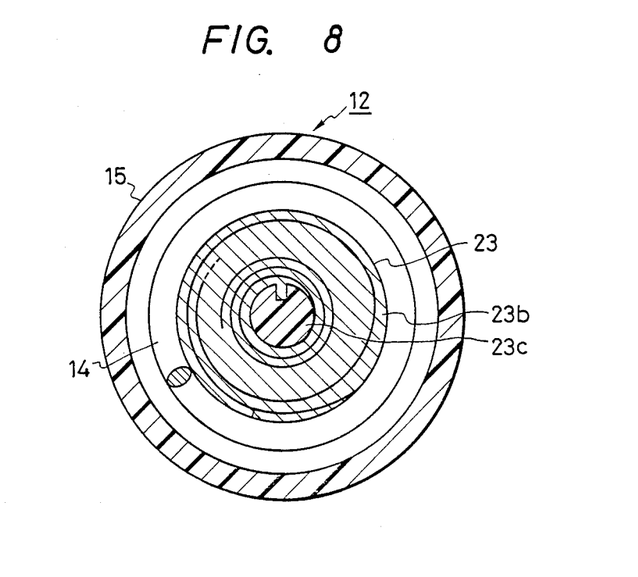
FIG. 8 is a sectional view of a coil assembly in the liquid level indicator
Figure 9:
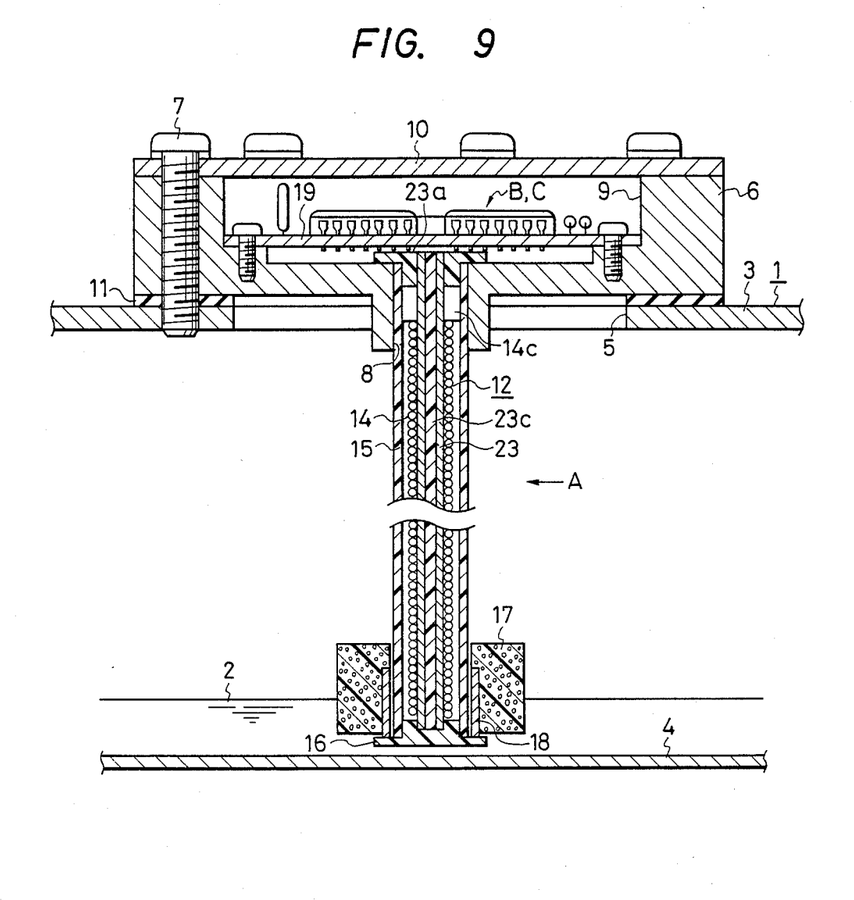
FIG. 9 is a sectional view showing the entire construction of a detecting section in the liquid level indicator.
Figure 10:
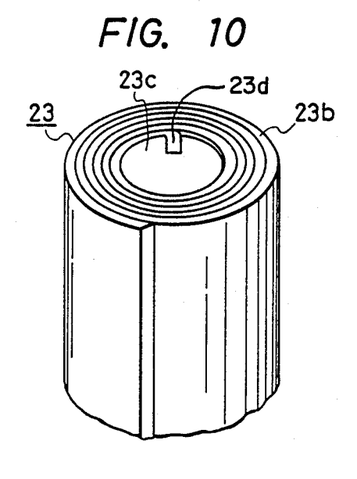
FIG. 10 is a perspective view showing a part of a core in the coil assembly.

In FIGS. 8 through 10, reference character 23c designates a winding core of polyester resin which is provided along the central axis of the aforementioned core assembly 23. The core 23c has a groove 23d extended longitudinally. A thin, plate-shaped magnetic material 23b is wound on the core 23c with one end of the magnetic material inserted into the groove 23d.

The magnetic material 23b of the core assembly 23 is a commercially available silicon steel plate about 0.1 mm in thickness, the surfaces of which have been coated with electrically insulating glass material. One end of the magnetic material is fitted into the groove 23d of the core 23c so that the innermost portion of the magnetic material 23b can be readily bent with a small radius of curvature. Under this condition, the magnetic material 23b is wound on the winding core 23c at least two turns, and the magnetic material layers are bonded to one another with adhesive such as varnish. Thus, the core assembly is formed.

The winding 14 is formed by spirally winding a wire on the core assemby 23. As the core assembly is in the form of a roll, the wire can be readily wound, and the wire gently curved. Therefore, no large stress is given to the wire in the wire winding operation. Furthermore, useless spaces are scarcely formed between the core assembly 23 and the winding 14. Therefore, the coil 12 can be made small in diameter, the coil 12 can be readily inserted into the fuel tank 1, the inductance can be increased as much, and it is unnecessary to increase the number of turns of the winding 14.

In order that no current closed loops are formed in the cross-sectional direction, the magnetic material layers or the end portions of the magnetic material are electrically insulated from each other, and therefore, only an extremely small eddy current flows in the cross-sectional direction of the core assembly, that is, the eddy current in the core assembly is so small that it can be disregarded. Furthermore, in the equivalent circuit of the coil, the winding component of the core assembly itself is substantially released, and therefore, the inductance variation of the coil is scarcely affected by the winding component.

While a few examples of the liquid level indicator have been described, it should be noted that the invention is not limited thereto or thereby. For instance, the liquid level indicator may be modified as follows:

(1) The magnetic material 13b (or 23b) forming the core 13 (or 23) is not limited to the aforementioned silicon steel plate. That is, any material may be employed as the magnetic material if it is a thin, plate-shaped conductive magnetic material. For instance, the material may be of ordinary steel such as soft steel, permalloy, or amorphous alloy.

(2) The configuration of the core 13 (or 23) is not limited to that which has been illustrated, that is, it can be freely determined according to an object to be measured. In addition, the thickness of the magnetic material 13b (or 23b) is not limitative; however, in order to prevent the eddy current or to facilitate the manufacture of the liquid level indicator, it is preferable that the thickness is in a range of from 0.1 mm to 1 mm.

(3) In the above-described examples, the cover part 13c and the core 23c are made of polyester resin; however, any resin which can remain constant in configuration can be employed to form the cover part or the core. The cover part and the core may be formed not only by extrusion but also by insert extrusion or the like.

Figure 7:
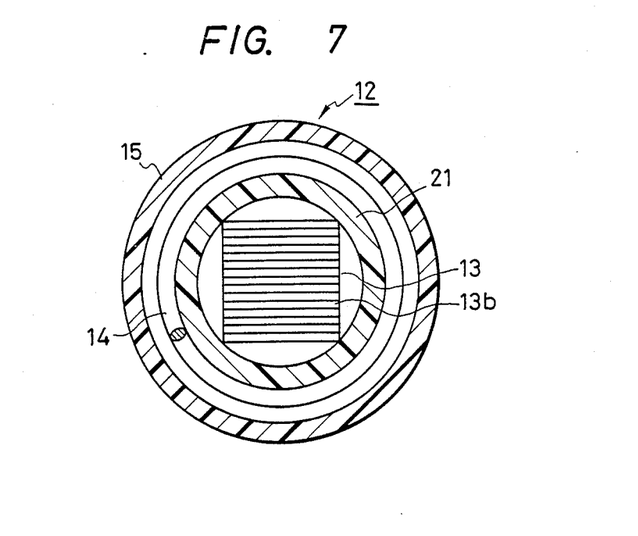
FIG. 7 is a sectional view of one modification of the coil assembly.

(4) Instead of the cover part 13c, a synthetic resin bobbin 21 may be put on the core 13 as shown in FIG. 7, before the winding 14 is formed around the bobbin 21. Alternatively, the winding 14 may be formed directly on the core 13.

Figure 11A:
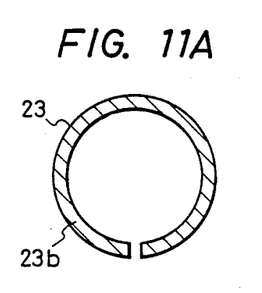
FIGS. 11A, 11B and 12 are sectional views of modifications of the core.
Figure 11B:
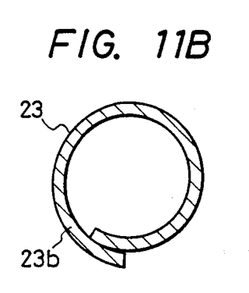

(5) In the second example of the liquid level indicator, the core assembly 23 is formed by winding the magnetic material 23b ten to thirty turns; however, the number of turns can be changed according to the required inductance or the thickness of the magnetic material 23b. The number of turns of the magnetic material 23b is not limited to at least two. That is, it may be one as shown in FIG. 11. However, in this case, in order to prevent the difficulty that both ends of the magnetic material are brought into contact with each other to form a closed current loop, it is necessary to provide a gap between the two ends as shown in FIG. 11A, or in the case where the two ends are laid on each other as shown in FIG. 11B it is necessary to electrically insulate the two ends from each other.

Figure 12:
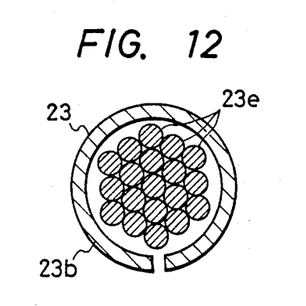

(6) Instead of the core 23c of synthetic resin, a plurality of linear magnetic materials 23e may be used as shown in FIG. 12. In this case, the plurality of linear magnetic materials 23e are bundled together while being electrically insulated from one another, and they are then inserted into the magnetic material 23b. The linear magnetic materials 23e together with the magnetic material 23b serve as the core assembly 23 of the coil 12, with the results that the inductance is increased, and the coil space efficiency is further improved.

The liquid level indicator according to the invention can be used not only for the fuel tank of an automobile but also for various containers such as oil tanks, water tanks, petroleum tanks and electrolyte tanks.

As is apparent from the above description, in the liquid level indicator according to the invention, (1) the eddy current loss in the core is small and the detection sensitivity is high; (2) the stray capacitance of the winding of the coil is so small that the coil voltage is scarcely distorted and therefore it is unnecessary to provide the stray capacitance cancelling means; (3) the core can be readily formed at relatively low manufacturing cost, and it is mechanically strong; (4) in the case where the core is provided inside the winding, the winding is formed by gently winding the wire on the core with the results that the wire can be readily wound on the core and no large stress is applied to the wire; (5) the coil can be made small in diameter which makes it possible to readily insert the coil into the container of a liquid to be measured and facilitates the increasing of the inductance; (6) the eddy current loss in the core is small, and therefore, the stray capacitance of the winding is extremely small; and (7) the core can be formed with ease, the long core can be readily manufactured at low cost, and its mechanical strength is sufficiently high.

What is claimed is:

1. A liquid level indicator for detecting a liquid level, comprising:
   a coil having a core extending in a longitudinal direction in said coil, said core being formed of conductive magnetic material disposed in said coil such that a plurality of magnetic material layers are formed in a direction perpendicular to the longitudinal direction of said coil, said magnetic material layers being electrically insulated from one another in the direction perpendicular to the longitudinal direction, and said coil further having a single winding wound around said core;
   an electrically conductive ring member fitted on said coil so as to be movable along the longitudinal direction thereof in response to a liquid level, the inductance of said coil being varied in response to the movement of said conductive ring member with respect to said coil; and
   means for detecting the variation in the inductance of said coil in response to said movement of said conductive ring member.

2. A liquid level indicator as claimed in claim 1, wherein said magnetic material layers are comprised of a plurality of thin, plate-shaped conductive magnetic materials disposed in parallel, one on another, in the direction perpendicular to the longitudinal direction of said coil.

3. A liquid level indicator as claimed in claim 1, wherein said magnetic material layers are comprised of a single thin, plate-shaped conductive magnetic material wound at least one turn in the form of a roll so that respective turns form each of said magnetic material layers.

4. A liquid level indicator of claim 1, wherein said electrically conductive ring member is formed of material having a small specific gravity so as to float on the liquid.

5. A liquid level indicator of claim 1, wherein said electrically conductive ring member has a float member, said float member having a small specific gravity so as to float on the liquid.

6. A liquid level indicator of claim 5, wherein a distribution of turns of said windings around said core is asymmetric along the longitudinal direction of said coil.

7. A liquid level indicator of claim 6, wherein said core includes:
   (a) a non-winding portion where said winding is not provided;
   (b) a flatwise winding portion where said winding is provided with a first density of turns;
   (c) a close winding portion where said winding is provided with a second density of turns which is larger than the first density; and
   (d) another non-winding portion where said winding is not provided,
   wherein said portions (a), (b), (c) and (d) are respectively arranged in said longitudinal direction of said coil.

8. A liquid level indicator of claim 7, wherein said coil further comprises a sleeve member for guiding said conductive ring member, said sleeve member being provided to cover said coil so that said conductive ring member is moved along said sleeve member.

9. A liquid level indicator for detecting a liquid level, comprising:
   a coil having a core extending in a longitudinal direction in said coil, said core being formed by a plurality of thin, plate-shaped conductive magnetic materials disposed in parallel, one on another, in a direction perpendicular to the longitudinal direction of said coil, said magnetic materials being electrically insulated from one another, and said coil further having a single winding wound around said core;
   an electrically conductive ring member fitted on said coil so as to be movable along the longitudinal direction thereof in response to a liquid level, the inductance of said coil being varied in response to the movement of said conductive ring member with respect to said coil; and
   means for detecting the variation in the inductance of said coil in response to said movement of said conductive ring member.

10. A liquid level indicator as claimed in claim 9, further comprising: a cylindrical cover part of synthetic resin which is formed around said core, said winding being formed around said cylindrical cover part.

11. A liquid level indicator as claimed in claim 9, wherein said coil includes portions at respective ends thereof having no windings and a close winding portion at the upper end of said coil so that the density of the magnetic flux is a maximum near the upper end of said coil.

12. A liquid level indicator as claimed in claim 9, rising a synthetic resin bobbin which is formed core, said winding being formed around the bobbin.

13. A liquid level indicator for detecting a liquid level, comprising:
   a coil having a core extending in a longitudinal direction in said coil, said core being formed by a conductive magnetic material wound at least one turn in the form of a roll having a longitudinal axis in said longitudinal direction in said coil, respective turns of said magnetic material being electrically insulated from one another in a direction perpendicular to the longitudinal axis, and said coil further having a single winding wound around said core;

an electrically conductive ring member fitted on said coil so as to be movable along the longitudinal direction thereof in response to a liquid level, the inductance of said coil being varied in response to the movement of said conductive ring member with respect to said coil; and means for detecting the variation in the inductance of said coil in response to said movement of said conductive ring member.

14. A liquid level indicator as claimed in claim 13, in which said magnetic material is wound on a winding core.

15. A liquid level indicator as claimed in claim 14, in which said winding core has a groove into which one end of said magnetic material is fitted.

16. A liquid level indicator of claim 13, wherein said coil further comprises a winding core on which said magnetic material is wound.

* * * * *